United States Patent [19]
Youngscap

[11] 3,882,791
[45] May 13, 1975

[54] COMBINED FLUID AND MAGNETIC TRANSMISSION SYSTEM

[75] Inventor: Richard L. Youngscap, Lincoln, Nebr.

[73] Assignee: ETS, Ltd., Santa Monica, Calif.

[22] Filed: Oct. 1, 1973

[21] Appl. No.: 401,997

[52] U.S. Cl. ............... 104/154; 104/147 R; 198/41; 198/DIG. 13
[51] Int. Cl. ............................................. B61b 13/00
[58] Field of Search ........ 104/154, 155, 160, 138 R, 104/138 G, 148 MS, 165, 147 R, 135; 198/41, DIG. 13; 302/14; 308/10; 318/38, 135; 310/11, 12, 13, 14

[56] References Cited
UNITED STATES PATENTS

| | | | |
|---|---|---|---|
| 2,150,440 | 3/1939 | Hargreaves | 310/12 X |
| 3,495,546 | 2/1970 | Brown et al. | 104/154 |
| 3,670,658 | 6/1972 | Stelling | 104/135 X |
| 3,760,245 | 9/1973 | Halvorsen | 104/154 X |

*Primary Examiner*—Lloyd L. King
*Assistant Examiner*—Randolph A. Reese
*Attorney, Agent, or Firm*—Lowe, Kokjer, Kircher, Wharton & Bowman

[57] ABSTRACT

A combined fluid and magnetic energy transmission system is developed whereby velocity is imparted to a fluid recirculating in a closed-loop, non-magnetic piping configuration and to ferromagnetic slugs spaced at regular intervals in piping. The velocity of the slugs is imparted to a carrier associated with and on the exterior of the piping by means of a permanent magnet incorporated with the carrier. Instead of being associated with a carrier, the permanent magnet can be connected with other mechanical components to deliver mechanical energy.

7 Claims, 5 Drawing Figures

COMBINED FLUID AND MAGNETIC TRANSMISSION SYSTEM

BACKGROUND OF THE INVENTION

1. Field of the Invention

The invention generally relates to the transmission of kinetic energy throughout a predetermined system configuration.

2. Description of the Prior Art

The conversion of energy sources to mechanical energy is accomplished primarily by means of motors or engines, i.e., internal combustion engines, electric motors, steam turbines, and the like. Transmission of mechanical energy from the point of origination to another point has been accomplished by the following general methods, each with attendant limitations.

a. Indirect coupling using a gas or liquid as the transmission medium. Examples are hydraulic, pneumatic, and vacuum systems. Some limitations are: (1) Difficulty in transferring the motion to an object external to the system, for instance, hydraulic systems embody a contained fluid; to transmit the motion or pressure to an exterior mechanism (i.e., a piston) requires seals or packing. (2) Constant, controlled velocity is almost impossible in a pneumatic or vacuum system due to the compressibility of air.

b. Direct coupling using chains, belts, gears, cables, etc. as the transmission medium. Some limitations within this classification are: (1) Length and configuration. Any system utilizing belts, chains, cable, etc., has length restrictions due to the stretch inherent in material under tension. At a critical point, a transfer from one unit (chain, cable, etc.) to another must be made; this transfer is both inefficient and a source of potential problems. In addition, it is difficult to develop a configuration, without transfers, for transmittal through all three space planes ($x$, $y$ and $z$). (2) Restricted velocities result when chains must mesh with sprocket wheels, and cables or belts remain seated in pulleys, etc. (3) Maintenance. The direct coupling systems generally have a large number of moving parts which must properly interface. This factor is compounded by the difficulty in predicting failures due to wear. Anticipated maintenance problems also often preclude installation in relatively inaccessible areas. (4) Another limitation is system inflexibility, which directly affects costs and application. For example, the size and weight of a chain conveyor system to transmit 10 pounds of force is not proportionately smaller and lighter than a unit to transmit 100 pounds of force. (5) Many of these systems are adversely affected by moisture, extreme cold, etc. In addition, oil drippage, metal particles (from wear) can also be deposited throughout the system.

SUMMARY OF THE INVENTION

The present invention will significantly reduce or eliminate entirely the limitations and/or disadvantages of previously existing mechanical transmission systems.

A closed-loop piping system, with the piping being an essentially non-magnetic material, of any length and configuration is established. The entire volume of the piping is filled by fluid with ferromagnetic slugs interspersed in the fluid at regular intervals. The slugs have a marginally smaller outside diameter than the inside diameter of the piping. Depending upon the length and configuration of the piping system and other design factors, one or more power sources are placed throughout the piping system. These power sources may impart velocity to the fluid directly (e.g., pump) and therby to the slugs, or to the slugs directly (e.g., external rotating magnets) and then to the fluid. In either case the final result is velocity imparted uniformly to all slugs in the piping system. Permanent magnets are located adjacent the piping and so designed that a minimal gap is maintained between the exterior of the piping and the magnetic poles by an air cushion, bearings, guide rails, or the like. When the magnets are placed in proper proximity to the exterior of the piping a magnetic attraction occurs between the magnet and the slugs inside the piping. Motion is imparted to the magnet and when the velocity of the slugs is equalled by the magnet, a magnetic bond is established with one particular slug. That bond remains until the magnet is removed from the tubing by mechanical force greater than the magnetic bond.

A payload can be attached directly to the magnet, and the weight of the payload and the magnet carried by the piping. Alternatively, the magnet can be connected to a separate payload-carrying member (e.g., track, rail, or the like) with a connection to the magnet. In addition, the magnet can be attached to a shaft or chain, in which case rotation or linear motion is imparted to those devices by the movement of the magnet.

The principal advantages of the invention

Among the principal advantages of the invention are:

a. It provides a system for conveying a payload and/or transmission of mechanical energy with a minimum of moving and mechanical parts.

b. It utilizes the advantage of low compressibility of liquids to provide controlled velocity throughout the system within the desired predetermined setting. This same advantage relates to the ease of establishing velocities within broad parameters. (The operating capacity of the pump, for example, would be the only factor determining between a velocity of 5 f.p.m. or 50 f.p.m.).

c. It eliminates the requirement for transfers from one conveying or transmission segment to another due to the length of the system. The invention can be one closedloop piping system of any length; only additional power sources need be added to maintain the required force and velocity of the fluid.

d. It substantially reduces the initial installation cost compared to previous devices performing comparable functions. The great percentage of the system involves only installation and support of non-metallic piping and possibly load bearing members. Wiring, valves, control units, etc., are eliminated except at power sources and at terminal or junction points where magnets are introduced or removed.

e. It provides the capability, within certain payload limitations, to operate the system in any configuration, including vertically upwards, without the necessity for special modifications or transfers.

f. It utilizes the recently developed improvements in the characteristics of permanent magnets and non-metallic piping.

g. It provides a method for transmitting force from an enclosed fluid system to points external of the enclosure without the use of pressure seals.

Other objects and features of the invention, together with the features of novelty appurtenant thereto, will appear in the course of the following description.

DETAILED DESCRIPTION

In the accompanying drawings, which form a part of the specification and are to be read in conjunction therewith, and in which like reference numerals indicate like parts in the various views.

Figure 1:
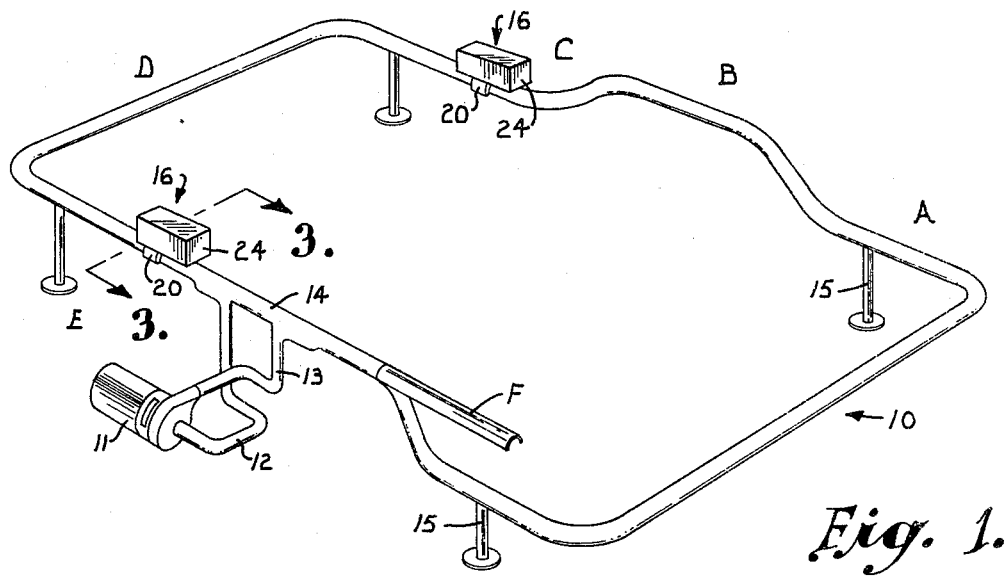
FIG. 1 is a schematic showing of a preferred system embodying the invention as used for conveying items from several locations to a single receiving station on a closedloop path.

Turning now initially to FIG. 1, reference numeral 10 indicated generally a closed loop of tubing or piping forming a conduit for circulating a fluid in the loop. The fluid may be any one of the number of compositions; I prefer water, optionally with an anti-freeze.

The piping is constructed of non-magnetic material, preferably polyvinyl chloride, and any joints are made so there are no internal or external projections, the intent being to provide a smooth exterior and bore of substantially uniform diameter throughout the length of the closed-loop. For reasons subsequently appearing, any bends should be made relatively gradual.

In the illustrated embodiment, the fluid is circulated by means of a pump 11 having a suction line 12 and a discharge line 13. As will subsequently be described in greater detail, the pump is intended to receive liquid from the line and return it under pressure while still leaving a continuous closed-loop in existence by means of the by-pass section 14 between the suction and the discharge lines.

The closed-loop 10 can be supported in any desired manner which leaves the top and sides of the pipe free from obstruction. For example, the trestles 15 are spaced at intervals along and beneath the piping and make contact with the underside thereof. The illustrated embodiment is intended as a conveyor for items from stations such as A, B, C, D, and E to a receiving station F, where they can be removed. The conveying is done by carriers 16 subsequently to be described in detial. As one example of a typical application of the invention, the system can be used for transporting hospital laboratory specimens from scattered nursing stations and clinics to a central laboratory for analysis. Thus stations A–E, inclusive, represent the nursing stations and clinics while F represents the collecting location at the laboratory. It will be apparent that a wide variety of configurations and lenths for the system, as well as locations for sending and receiving stations are possible. Moreover, it may in some instances not be necessary to have a removing station such as at F; instead the carriers could simply be circulated on a continuous or intermittent basis with loading and unloading being done at various points.

With reference to the remaining figures of the drawing, there are slugs 17 spaced throughout the system at predetermined intervals. The slugs may be non-magnetized but are constructed of a material capable of magnetic attraction, such as a ferromagnetic material. The slugs are smoothly contoured to facilitate their travel through the conduit and conform in cross sectional outline with the interior cross-section of the pipe. Their dimensions are, however, somewhat less than the interior dimensions of the piping so that the slugs can flow freely along the conduit and successfully traverse the bends in the system.

Slugs 17 are each preferably fitted on the exterior with one or more skirt-like flanges 18 ringing the slugs. These are composed of a resilient flexible material, e.g., rubber or a rubber-like composition, and are intended to provide a surface which sealingly engages the interior of the conduit so as to prevent relative flow of the liquid past the slugs. It will be noted that the skirts or sealing gaskets are cone configured, the angle of the cone being approximately 135 degrees relative to the direction of travel of the slugs.

If desired, and in order to assure of an absolutely positive spacing between successive slugs 17, small spheres 19 of lightweight plastic (e.g., polyvinyl chloride) can be located between the slugs, thereby forming a moving spacer assembly which has negligible resistance to flow through the loop and full capability of adjusting itself to the bends and transitions in the system.

Figure 2:
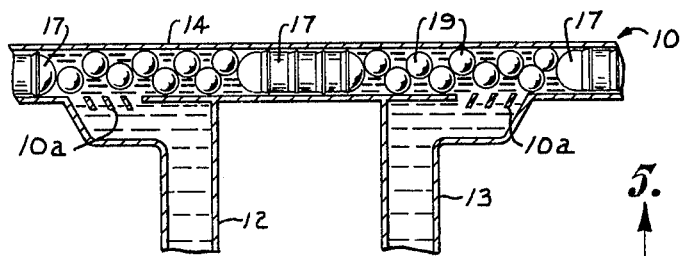
FIG. 2 is a fragmentary section, on an enlarged scale, illustrating slug by-pass and pump connections for the closedloop.
Figure 3:
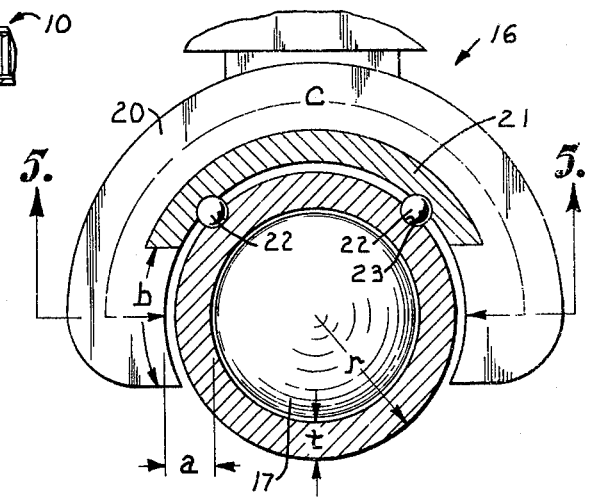
FIG. 3 is a cross-sectional view, on an enlarged scale, taken generally along line 3—3 of FIG. 1.
Figure 4:
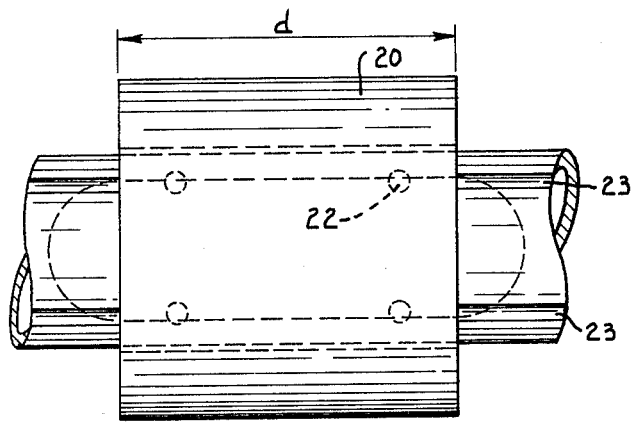
FIG. 4 is a top plan view of a typical permanent magnet (with the transport carrier box removed)
Figure 5:
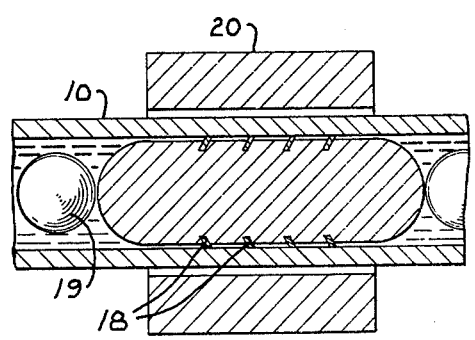
FIG. 5 is a fragmentary longitudinal section through the conduit on the line 5—5 of FIG. 3 in the direction of the arrows showing further details of slug and spacer construction, the interrupted lines representing interrupted length.

As earlier noted, the circulation of the slugs and fluid is maintained by pump 11 which operates to produce a positive pressure differential to produce the direction of movement. The pump is connected with the systems so that liquid can be withdrawn from and returned to the system without requiring removal of the slugs 17 or the spacer spheres 19. This is illustrated in FIG. 2.

The suction and return lines 12 and 13 make connection with the main piping below the horizontal center line of the piping so that movement of the carriers 16 is not hindered. In the transition from the piping to the suction and return lines, baffles or screens 10a are interposed in order to prevent entry of the slugs thereto. It will be noted in particular that the discharge line returns to the pipe line by means of a transition section which produces a horizontal component of flow velocity. The horizontal component has the effect of creating induction effect on the liquid in the transition section tending to move the intermediate slug (slug positioned between the suction and discharge lines in the transition section 14). It will be apparent that the spacing between the suction and discharge transitions must be such that both the suction and discharge outlets are never both covered at the same time by a passing slug.

The carriers 16 each have as a principal component a permanent magnet 20 which is preferably shaped generally as a semicircle and dimensioned to fit loosely over the pipe. The magnet includes a non-magnetic insert 21 on the underside in which are provided semi-spherical seats or sockets for ball bearings 22. In the illustrated embodiment there are four such bearings for each carrier and they are adapted to ride during movement along the pipe in parallel grooves or tracks 23 formed in the exterior of the pipe.

In the illustrated embodiment the magnets 20 support containers 24 which can be used as receptacles for items to be transported by the system.

When the pump is in operation, the slugs will be put in motion, continuous circulating through the piping. When the magnet equipped carriers 16 are placed on the piping magnetic attraction is established between the magnets and slugs. The attraction imparts motion to the carrier and the carrier will accelerate until it obtains a velocity to equal that of the slugs. At that time a bond between a given carrier and a particular slug is achieved. The magnetic bond is maintained so long as the carrier is associated with the pipe. The magnet can be removed by diverting it from the pipe as shown at F in FIG. 1 or by simply lifting it off. It likewise can be stopped by interposing a barrier to further movement.

Theoretically, the number of magnets carried by the system at one time could equal the number of slugs.

While I have illustrated the magnets as associated with containers, it will be evident that magnets could be attached to carriers supported independently of the pipe and moving parallel with the pipe. It will also be apparent that the magnets could be configured to engage other devices adjacent to the system to impart motion thereto.

When the slugs are in motion, and a given magnet has obtained the system velocity, it will to some extent trail behind the slug to which it is magnetically bonded. Thus the force of magnetic attraction will have a component in the direction of motion. For horizontal motion, the component need only be strong enough to overcome the friction of the ball bearing assemblies; for vertical motion it must also include the weight of the magnet and payload.

The force of magnetic attraction can be written in the form: $F = k\,BHV/a$ where $BH$ is the energy product related to the material of which the magnet is made, $V$ is the volume of the magnet and $a$ is the width of the air gap (distance from the slug to the poles and of the magnet). The numerical coefficient $k$ depends on geometrical factors (including flux leakage) but can generally be expected to be on the order of 0.02–0.05. The two components of $F$ can now be written as:

$$F_1 = k_1 \frac{BHV}{a} \text{(drag component)}$$

$$F_2 = k_2 \frac{BHV}{a} \text{(normal component)}$$

where $k_1$ and $k_2$ are related to $k$ by:

$$k_1 = k \sin' \bar{\theta}$$

$$k_2 = k \cos \theta$$

The angle $\theta$ may be expected to be small (10°–20°). In any case, both $k_1$ and $k_2$ can be estimated as being approximately 0.01.

The resulting formulas for the weight of the payload $W_p$ in relation to the weight of the magnet $W_m$ are as follows:

$$\text{(Horizontal motion)} \quad W_p = \left(\frac{k_1}{\mu} - k_2\right)\frac{BHV}{a} - W_m$$

$$\text{(Vertical motion)} \quad W_p = (k_1 - \mu k_2)\frac{BHV}{a} - W_m$$

Since the coefficient of friction $\mu$ is quite small (estimated at 0.1), the payload is appreciably greater for horizontal motion than for vertical. For illustration, the results of applying the above formulas and assuming: (1) use of a magnetic material with $BH = 5 \times 10^6$ gauss-oersteds, (2) ball - socket coefficient of friction $\mu =$ 0.1, (3) volume of magnet = $V = 100$ cm, (4) weight of magnet = $W_m = 730$ grams and (5) gap $a = 1.0$ cm:

(Horiz.) $W_p = 100$ lbs. (62 times weight of the magnet)

(Vert.) $W_p = 10$ lbs. (6.2 times weight of the magnet)

Note that $W_p$ in the formulas also equals the shear force of the magnetic bond between the magnet and the slug.

In any magnet configuration, the following formula must be closely approximated if full utilization of the energy product of the magnet material is to be realized:

$$\frac{\text{Length of magnet} \times \text{area of gap}}{2 \times \text{length of gap} \times \text{area of magnet}} = \frac{B}{H}$$

Using the magnet configuration illustrated in the figures and assuming, for example, the use of the magnetic material with the characteristics of $BH = 5 \times 10^6$, $B/H = 20$, the dimensions listed below satisfy the formula above. All dimensions are listed in terms of the outside radius of the piping $l = r$.

Wall thickness of piping $l$ (max.) $= t = 0.27r$
Depth of magnet $= d = 5.15r$.
Area of gap $a = bd = 5r^2$
Length of Magnet $= 7.75r$
Area of magnet $= 2.27r^2$
Length of gap $= a = 1.56\,t = 0.42r$ The foregoing calculations are based on the use of non-magnetized, ferromagnetic slugs. While I have used the term "ferromagnetic" in the claims, it is intended to embrace other materials having similar qualities of response to magnetic attraction.

From the foregoing it will be seen that this invention is one well adapted to attain all of the ends and objects hereinabove set forth together with other advantages which are obvious and which are inherent to the system and components.

It will be understood that certain features and subcombinations are of utility and may be employed without reference to other features and subcombinations.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A system for transmitting mechanical energy from one location to another in a defined path, said system comprising, in combination a conduit of nonmagnetic and nonmagnetizable material;

means for pumping fluid through the conduit;

a slug in the form of a stable, nondeformable ferromagnetic mass, said slug located within said conduit and free to move with said fluid and so shaped that it includes a portion which substantially conforms in cross sectional configuration to the configuration of the interior of the conduit whereby to inhibit any substantial by-pass of fluid past the slug thereby to cause the fluid to impart a velocity to the slug substantially equal to that of the slug; and a permanent magnet located outside the conduit and supported for movement along the conduit, said permanent magnet moving with the slug when the latter is in the magnetic field of the magnet.

2. A system as in claim 1, said slug including sealing means engaging the interior walls of said conduit and blocking flow of fluid past the slug.

3. A system as in claim 2,
said sealing means including flexible skirting around the slug with the free edge of the skirting in sealing contact with the conduit wall.

4. A system as in claim 1, including
a plurality of said slugs of magnetic material, and
means for maintaining the slugs at a predetermined spacing relative to one another along the conduit during movement.

5. A system as in claim 4,
said spacing means comprising spherical elements interposed between successive slugs.

6. The combination as in claim 1, including a carrier supported on the conduit, said permanent magnet connected with said carrier,
said conduit provided with track means along at least a portion of the length thereof in the form of a pair of laterally spaced grooves extending along the exterior of said conduit portion,
said carrier including track engaging members for following said track and stabilizing the carrier with respect to the conduit, said track engaging members comprising balls partially caged in the carrier and riding in the grooves.

7. A system as in claim 1, including
means associated with said conduit and operable in response to movement of said magnet passed a predetermined point to separate said magnet laterally away from said conduit thereby to break the bond between the magnet and slug.

* * * * *